April 30, 1968  A. WINKLER  3,380,361
PHOTOGRAPHIC CAMERA WITH PRESSER PLATE MEANS
Filed April 7, 1965
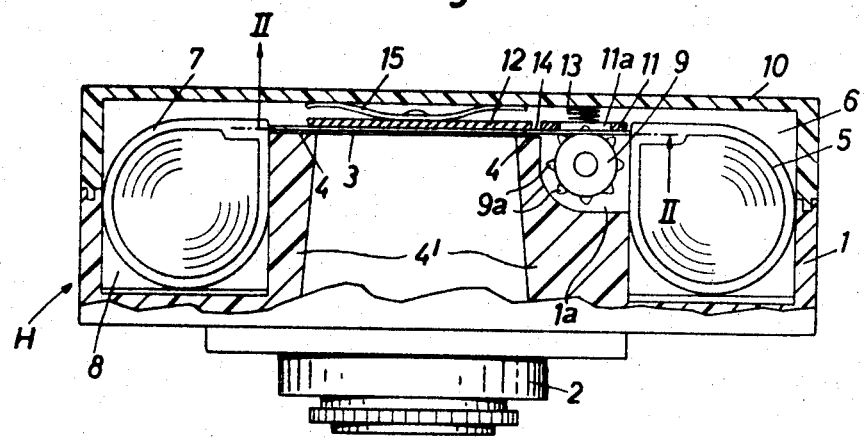
*Fig.1*
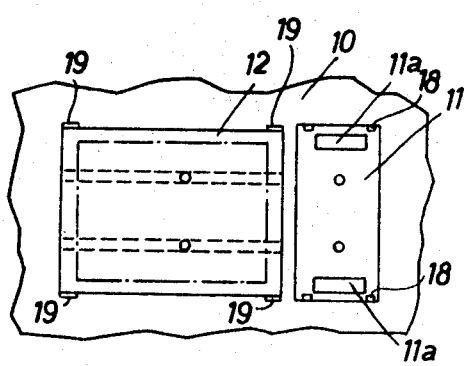
*Fig.2*
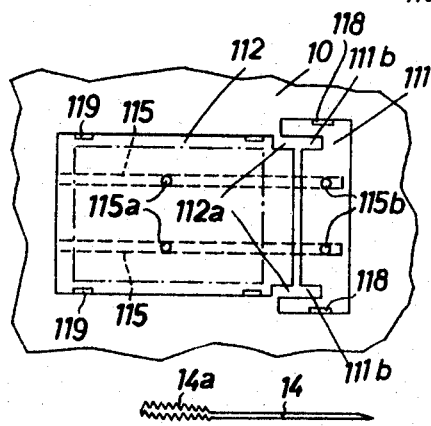
*Fig.3*
*Fig.4*
INVENTOR:
ALFRED WINKLER
BY
Michael J. Striker
his ATTORNEY

United States Patent Office

3,380,361
Patented Apr. 30, 1968

3,380,361
PHOTOGRAPHIC CAMERA WITH
PRESSER PLATE MEANS
Alfred Winkler, Munich, Germany, assignor to Agfa
Aktiengesellschaft, Leverkusen, Germany
Filed Apr. 7, 1965, Ser. No. 446,217
Claims priority, application Germany, Apr. 30, 1964,
A 45,923
10 Claims. (Cl. 95—31)

ABSTRACT OF THE DISCLOSURE

A photographic camera wherein the rear wall carries two panels of a composite presser plate. One panel is located behind a sprocket which serves to transport the film and is mounted between the chamber for the supply cartridge and a frame which defines the exposure opening. The other panel is located behind the frame and each of the panels is biased forwardly but the bias upon the other panel is less than upon the one panel. The width of the film channel in front of the one panel exceeds the width of the film channel in front of the other panel. The film has a thickened leading end which can pass freely in front of the one panel but can move the other panel away from the frame.

---

The present invention relates to photographic cameras, and more particularly to cameras of the type wherein the film is transported from a cartridge or magazine, behind the exposure opening and into or onto a film-collecting member such as a cartridge, a magazine or a spool. Still more particularly, the invention relates to a photographic camera which comprises a novel presser plate.

It is well known to provide the rear wall of the camera housing with a one-piece presser plate serving to define with the front part of the camera housing an elongated film channel through which the film is transported on its way from a pay-out cartridge to take-up spool or the like. It is also known to utilize in such cameras pay-out cartridges of the spool-free type wherein the film can be coiled up without being connected to a rotary spool. In order to prevent edgewise penetration of light rays through the front end portion of the coiled film, the front end portion is preferably provided with transversely extending ribs, corrugations or similar unevennesses which render the front end portion thicker than the remainder of the film. This creates certain problems, especially if the camera is equipped with a film transporting mechanism which is constructed to automatically advance the front end portion through the film channel and into the film-collecting (take-up) cartridge or spool. The teeth on the sprocket wheel or wheels of the transporting mechanism must properly enter the perforations of the relatively thick front end portion in order to transport the film through the entire film channel and to the film-collecting member. Therefore, the presser plate must cooperate with the transporting mechanism to insure that the teeth of each sprocket wheel actually penetrate into the corresponding perforations but, on the other hand, the presser plate should not scratch or otherwise damage the next-following portion of the film. In other words, it is desirable to construct and to mount the presser plate in such a way that it cooperates with the film transporting mechanism in preventing uncontrolled movements of the film, and the presser plate should also serve as a means for holding the film flat against the front portion of the camera housing behind the exposure opening without, however, scratching or otherwise affecting the quality of the film. It was found that a one-piece presser plate cannot meet such requirements to the extent necessary in a modern high-quality photographic camera.

Accordingly, it is an important object of my present invention to provide a very simple, easy to install and lightweight presser plate which fully meets all of the above-enumerated requirements by cooperating with the transporting mechanism to insure proper advance of the film toward the film-collecting member and by cooperating with the housing of the camera to flatten that portion of the film which is to be exposed when the user decides to take a picture.

Another object of the invention is to provide a presser plate of the just outline characteristics which is especially suited for use in photographic cameras of the type operating with spool-free film cartridges and in cameras wherein the leading end of the film is automatically introduced into a take-up cartridge or is coupled to a take-up spool.

A further object of the invention is to provide a photographic camera which is equipped with a presser plate of the just outlined characteristics and wherein the presser plate is installed in such a way that it assists but cannot interfere with the operation of the film transporting mechanism.

An additional object of the invention is to provide a composite presser plate and to provide a novel connection between the individual components of such presser plate.

Still another object of the invention is to provide an improved housing which may be utilized in a camera embodying a presser plate of the just outlined characteristics.

A concomitant object of the invention is to provide a presser plate which can form with the camera housing an open or closed film channel and which can be used with equal advantage in connection with photographic films having relatively thick front end portions or with films whose thickness is constant from end to end.

A further object of the instant invention is to provide an improved connection between the presser plate and the rear wall of a camera housing.

Briefly stated, one feature of my invention resides in the provision of a photographic camera whose presser plate comprises two separate portions the first of which cooperates with the film transporting mechanism and the second of which serves to flatten that portion of the film which is about to be exposed. It is preferred to provide a relatively strong spring for the first portion of the presser plate which cooperates with the film transporting mechanism, to provide a weaker spring for the second portion of the presser plate which is used to keep a portion of the film flat behind the exposure opening, and to arrange the two portions of the presser plate in such a way that they form a composite film channel one section of which is narrower than the other section, especially if the film is of the type having a front end portion whose thickness exceeds the thickness of the remainder of the film.

If the first section of the film channel is wider, the front end portion of the film can be readily advanced by the transporting mechanism to pass through the second section of the film channel adjacent to the second portion of the presser plate which is subjected to a weaker biasing force. Once the front end portion is properly received in or on the film-collecting member, the first portion of the presser plate merely insures that the film is properly engaged by the transporting mechanism and the second portion of the presser plate performs the same function as a conventional one-piece presser plate. It is of no consequence that the second portion of the presser plate might scratch or otherwise mark the relatively thick front end portion of the film because such front end portion is not used in making a picture but serves solely to prevent edgewise penetration of light rays toward and into the next-following portion of the film and to safely anchor the film in the collecting spool or cartridge.

The novel features which are considered as characteristic of the invention are set forth in particular in the appended claims. The improved photographic camera itself, however, both as to its construction and the mode of assembling and manipulating the same, together with additional features and advantages thereof, will be best understood upon perusal of the following detailed description of certain specific embodiments with reference to the accompanying drawings, in which:

FIG. 1 is a horizontal section through a candid camera which is constructed and assembled in accordance with a first embodiment of my invention;

FIG. 2 is a fragmentary vertical section as seen in the direction of arrows from the line II—II of FIG. 1;

FIG. 3 is a similar fragmentary vertical section and illustrates a portion of a modified camera; and FIG. 4 is a fragmentary side elevational view of a photographic film which may be utilized in the camera of FIG. 1 or 3.

Referring first to FIGS. 1 and 2, there is shown a candid camera which comprises a housing H including a front portion 1 and a rear wall 10 which is hinged to or is fully detachable from the front portion 1. The front portion defines two spaced chambers 6 and 8 and comprises a frame 4' defining an exposure opening 3 located behind the lens mount 2. The frame 4' is provided with a plano rear side or face 4 which surrounds the rear end of the opening 3. The front portion 1 of the housing H is further provided with a cavity 1a which is immediately adjacent to the rear side 4 of the frame 4' and accommodates certain component parts of a film transporting mechanism. FIG. 1 shows one of two coaxial sprocket wheels 9 having projections or teeth 9a which extend into and through the customary perforations provided in the longitudinal edge portions of a photographic film 14. The film is stored in a spool-free film cartridge 5, which is accommodated in the chamber 6, and is taken up in a film-collecting member 7 accommodated in the chamber 8. In the illustrated embodiment, the member 7 is a cartridge having a suitable mouth through which the film 14 is fed in response to actuation of the transporting mechanism, i.e., in response to rotation of the sprocket wheels 9 in a counterclockwise direction as the parts appear in FIG. 1. That length of the film 14 which extends between the cartridges 5 and 7 is adjacent to the rear side 4 of the frame 4' and overlies the exposure opening 3.

In accordance with my present invention, the customary one-piece presser plate is replaced by a composite presser plate which is mounted at the inner side of the rear wall 10 and comprises two panel-shaped portions 11 and 12, hereinafter called panels. The larger panel 12 is located behind that length of the film 14 which extends between the cartridge 7 and the sprocket wheels 9 and is located opposite the rear side 4 of the frame 4'. The smaller panel 11 is located opposite the sprocket wheels 9 and is formed with a pair of cutouts or windows 11a (see FIG. 2) into which the teeth 9a extend. In other words, the panel 11 cannot hinder the operation of the film transporting mechanism. Two relatively strong helical springs 13 operate between the inner side of the rear wall 10 and the outer side of the panel 11 to bias the latter in a direction toward the sprocket wheels 9 so that the inner side of the panel 11 normally abuts against suitable spacers or stops 18 provided on the rear face of the front housing portion 1 and located above and below the perforated longitudinal edges of the film 14. FIG. 2 shows that the front portion 1 comprises two pairs of such spacers 18; however, it is clear that the spacers may be provided on the panel 11 and then abut against the adjacent surfaces of the front portion 1.

Similar spacers or stops 19 are provided on the frame 4' and serve to arrest the panel 12 at a minimum distance from the rear side 4. Alternatively, the spacers 19 may be provided on the panel 12 and then abut against the rear side 4 of the frame 4'. The panel 12 is biased by two relatively weak leaf springs 15 which are riveted or otherwise secured thereto and which are mounted at or merely abut against the inner side of the rear wall 10. In accordance with an important feature of my invention, the bias of the springs 13 exceeds the bias of the springs 15 so that the panel 11 may be pressed with a force which is greater than the force acting upon the panel 12.

The panels 11, 12 and the front portion 1 define between themselves an elongated narrow film channel a section of which extends along the rear side 4 of the frame 4' and through which a length of film travels when the front end portion 14a of the film 14 is accommodated in the cartridge 7 and the transporting mechanism is set in motion. The minimum width of that section of the film channel which is adjacent to the rear side 4 is normally less than the minimum width of that section of the film channel which is adjacent to the front face of the panel 11.

One type of film which may be utilized in the camera of FIGS. 1 and 2 is illustrated in FIG. 4. The film 14 comprises a main portion of constant thickness and a front end portion 14a which is serrated, grooved or otherwise roughened to prevent edgewise penetration of light rays and eventual exposure of convoluted film in the cartridge 5. The thickness of the front end portion 14a exceeds the thickness of the remainder of the film 14.

The minimum width of that section of the film channel which is adjacent to the front face of the panel 11 is selected in such a way that it exceeds the thickness of the front portion 14a of the film 14. In other words, the ribs of the front end portion 14a can pass through this section of the channel but the perforations of the end portion 14a are sufficiently close to the sprocket wheels 9 to insure that the teeth 9a extend through the perforations and invariably advance the film 14 when the transporting mechanism is actuated in a sense to rotate the sprocket wheels in a counterclockwise direction. The difference between the minimum width of the channel section in front of the panel 11 and the thickness of the front end portion 14a is minimal, i.e., the spacers 18 are dimensioned in such a way that the springs 13 can move the panel 11 rather close to the front portion 1 but invariably insure that the ribs of the front end portion 14a can advance through the first section of the channel and on toward the panel 12 and cartridge 7. The teeth 9a extend into the cutouts 11a and, therefore, the panel 11 cannot prevent rotation of the sprocket wheels 9. Also, the provision of cutouts 11a insures that the panel 11 is not scratched by the teeth 9a which could result in premature wear on the sprocket wheels and/or on the presser plate.

The purpose of the panel 12 is to insure that the film 14 lies flat against the rear side 4 of the frame 4'. The springs 15 may be prestressed to insure that the minimum width of the channel section extending between the rear face 4 and the front side of the panel 12 is just sufficient to allow for advance of the film 14 and to simultaneously insure that the exposure opening 3 in the frane 4' is closed by a flat film portion. Such portion of the film is exposed when the user takes a picture. The channel section between the rear side 4 and panel 12 may be of the open or closed type. The film channel is said to be closed if the panel 12 is free to abut directly against the rear side 4 when the film 14 is removed from the camera, when the entire film is stored in the cartridge 5 or when the entire film is stored in the cartridge 7. The film channel is said to be open if the camera comprises the aforementioned spacers 19 which prevent the panel 12 from coming in direct abutment with the rear side 4 of the frame 4', even at such times when the film channel is empty. Thus, the spacers 19 constitute an optional feature of the camera. When the film channel is of the closed type and happens to be empty, the springs 15 may cause the panel 12 to bear against the rear side 4 with a very small force to insure that the film is not scratched when it is transported through this closed channel and on toward the cartridge 7. The maximum width of a closed film channel never exceeds the thickness of that length of film which extends along the rear side 4 because the panel 12 will move away from the frame 4' only to such an extent as is necessary to provide room for the film at the rear side of the frame. The minimum width of an open channel can exceed the thickness of the film if the spacers 19 are dimensioned in such a way that they invariably hold the panel 12 at a predetermined minimum distance from the rear side 4. However, it is obvious that the dimensions of the spacers 19 will be selected with a view to insure that the minimum width of the channel section extending along the rear side 4 exceeds only slightly the thickness of the film 14 to make sure that the film will lie flat against the frame 4' and cannot curl while the user makes an exposure. The panel 12 might even scratch the front end portion 14a but this is of no consequence because the front end portion 14a is not used in taking of pictures.

When the user decides to insert a fresh cartridge 5, the the rear wall 10 is either removed or is pivoted to such position that the chambers 6 and 8 are accessible and that the composite presser plate including the panels 11, 12 is moved away from the front portion 1. The front end portion 14a of the film 14 extends from the mouth of a fresh cartridge 5 and, once the fresh cartridge is properly inserted in the chamber 6, the user places the front end portion 14a over the sprocket wheels 9 so that at least one tooth 9a of each sprocket wheel passes into and through the corresponding perforation. The rear wall 10 is then returned to the sealing position of FIG. 1 whereby the springs 13 cause the panel 11 to bear against the spacers 18 and to determine the minimum width of that channel section which is located between the sprocket wheels 9 and the panel 11. The bias of the springs 13 is strong enough to insure that the sprocket wheels 9 properly engage and transport the film whenever the user decides to actuate the transporting mechanism of the camera. The springs 13 then oppose the natural tendency of the film to curl and to move away from the sprocket wheels. In response to actuation of the transporting mechanism and in response to resultant rotation of sprocket wheels 9 in a counterclockwise direction, the front end portion 14a is caused to penetrate into that section of the film channel which is adjacent to the rear side 4 of the frame 4' so that the front end portion 14a overcomes the bias of the springs 15 and moves the panel 12 away from the frame. The front end portion 14a continues to travel through and beyond the film channel so as to enter the mouth of the cartridge 7. Once the ribs of the end portion 14a advance beyond the panel 12, the springs 15 are free to expand and cause the panel 12 to bear against the spacers 19 or (in the absence of such spacers) directly against the rear side of the film 14, i.e., against that side of the film which faces away from the exposure opening 3. If the cartridge 7 is replaced by a film-collecting member in the form of a spool, the front end portion 14a can be automatically coupled to such spool and the next-following part of the film 14 is coiled around the core of the spool whenever the user actuates the transporting mechanism.

The dimensions of the spacers 18 between the panel 11 and the corresponding part of the front housing portion 1 are selected in such a way that the panel 11 cannot scratch the film 14 but is sufficiently close to the sprocket wheels 9 to insure that the teeth 9a invariably enter consecutive or selected perforations at the corresponding edge portion of the film. In other words, once the relatively thick front end portion 14a advances beyond the panel 11, the latter need not touch the film 14 but merely serves as a means for retaining the teeth 9a in the corresponding perforations. It is clear that the present invention may be embodied in a camera which utilizes non-perforated film and wherein the sprocket wheels 9 are replaced by wheels which are provided with needle-like projections serving to penetrate into the material of the unperforated film and to positively advance the film whenever the transporting mechanism is set in motion. The cutouts 11a in the panel 11 then serve to accommodate the tips of needles on the transporting wheels.

FIG. 3 illustrates a portion of a slightly modified camera wherein the larger panel 112 of the composite presser plate extends into the range of the sprocket wheels, not shown. The width of the panel 111 is somewhat less than the width of the panel 11, and the two panels 111, 112 are respectively provided with pairs of cutouts 111b, 112a whereby the cutouts of each pair 111b, 112a form a cutout corresponding to one of the cutouts 11a shown in FIG. 2. The four spacers for the larger panel 112 are shown at 119, and the numerals 118 denote a single pair of spacers which keep the panel 111 at a minimum distance from the front housing portion 1.

The panels 111, 112 are connected to each other but are free to perform limited movements independently of each other. In the embodiment of FIG. 3, the connection between the panels 111, 112 is established by two elongated leaf springs 115 which are secured to the panel 112 by rivets 115a. Similar rivets 115b secure the springs 115 to the panel 111. The springs 115 are configured in such a way that their bias upon the panel 111 exceeds the bias upon the panel 112. The manner in which the springs may be shaped to subject the two panels to biasing forces of different magnitude will be readily understood by persons having average skill in the art. The rear wall 10 supports the springs 115 so that the panels 111, 112 will move away from the front part 1 of the housing H when the rear wall is moved to a position in which the chambers 6, 8 are exposed.

It is evident that the camera of my invention may be used with equal advantage in connection with films whose thickness is constant from end to end. In such cameras, the width of the film channel in front of the panels 11, 12 or 111, 112 may remain constant but the panel 11 or 111 is biased with a greater force to insure that the film is properly engaged by the sprocket wheels 9 and is automatically transported into the cartridge 7. The panel 11 or 111 is then preferably provided with suitable guide rails serving to engage the film only in the zones which are immediately adjacent to the rows of perforations and to press such zones against the sprocket wheels 9 and/or against the rear side 4 of the frame 4'. In other words, if the thickness of the film is constant, the panel 11 or 111 (and, if desired, the panel 12 or 112) may be configurated in such a way that only small portions of its inner side come in actual engagement with that length of film which passes through the film channel. The aforementioned guide rails engage such portions of the film which are above and below the exposure opening 3 so that the rails cannot scratch the median film portion which is exposed to light rays when the user takes a picture.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be secured by Letters Patent is:

1. In a photographic camera, a combination comprising a housing defining a pair of spaced chambers and including a frame located between said chambers, said frame having a rear side and defining an exposure opening; a film cartridge provided in one of said chambers; a film-collecting member provided in the other of said chambers; that portion of the film which extends between said cartridge and said member being adjacent to the rear side of said frame and overlying said exposure opening; film transporting means comprising a film-engaging element mounted in said housing; a presser plate provided in said housing, said presser plate having a first portion located behind said portion of the film between said frame and said cartridge, and a second portion located behind said portion of the film and disposed opposite said frame, said presser plate and said housing defining between themselves a narrow channel through which said portion of the film extends and said channel having wider and narrower sections respectively located in front of the first and second portions of said presser plate; and resilient means including a first portion for biasing the first portion of said presser plate in a direction toward the film with a first force and a second portion for biasing the second portion of said presser plate in a direction toward said frame with a second force which is weaker than said first force.

2. A combination as defined in claim 1, wherein said film-engaging element includes at least one sprocket located between said cartridge and said frame and having projections extending through the film and into at least one recess provided therefor in said first and second portions of the presser plate.

3. A combination as defined in claim 1, wherein said portions of the presser plate are elastically coupled to each other.

4. A combination as defined in claim 1, wherein said cartridge accommodates a supply of roll film having a front end portion whose thickness exceeds the thickness of the remainder thereof and wherein said film engaging element is located in front of the first portion of said presser plate.

5. A combination as defined in claim 4, wherein said film engaging element comprises rotary sprocket means having projections extending through the film and into at least one recess provided therefor in the first portion of said presser plate.

6. In a photographic camera, in combination, a housing defining a pair of spaced chambers and including a frame located between said chambers, said frame having a rear side and defining an exposure opening; a film cartridge provided in one of said chambers; a supply of film provided in said cartridge, said film having a front end portion whose thickness exceeds the thickness of the remainder thereof; a film-collecting member provided in the other of said chambers, that length of the film which extends between said cartridge and said member being adjacent to the rear side of said frame and overlying said exposure opening; a film transporting mechanism provided in said housing and including a film-engaging element located between said frame and said one chamber and arranged to engage said length of film from that side which faces said frame; a presser plate located behind said length of film and including a first portion disposed opposite said frame and a second portion disposed opposite said film-engaging element, said presser plate and said housing defining between themselves an elongated channel through which said length of film extends, said channel including a narrower section adjacent to the first portion of said presser plate and a wider section adjacent to the second portion of said presser plate, the width of the narrower section of said channel being such that the first portion of said presser plate is moved away from said frame when the front end portion of said film is transported therethrough; and resilient means for respectively biasing said first and second portions of the presser plate in a direction toward said frame and said film-engaging element, the bias of said resilient means upon said second portion of the presser plate exceeding the bias upon said first portion.

7. In a photographic camera, in combination, a housing defining a pair of spaced chambers and including a frame located between said chambers, said frame having a rear side and defining an exposure opening; a film cartridge provided in one of said chambers; a supply of film in said cartridge; a film-collecting member provided in the other of said chambers, that length of the film which extends between said cartridge and said member being adjacent to the rear side of said frame and overlying said opening; film transporting means comprising a wheel rotatably mounted in said housing between said frame and said one chamber and having projections extending into and through said film from that side of the film which faces the rear side of said frame; a composite presser plate located behind said length of film opposite said frame and said wheel, said presser plate and said housing defining between themselves a narrow channel through which said length of film extends and said presser plate having at least one cutout arranged to accommodate the projections of said wheel; and resilient means for biasing said presser plate in a direction to reduce the width of said channel, said resilient means including a first portion for biasing with a smaller force that part of the presser plate which is located opposite said frame and a second portion for biasing with a greater force that part of the presser plate which is located opposite said wheel.

8. In a photographic camera, in combination, a housing comprising a front portion defining a pair of spaced chambers and including a frame located between said chambers, said frame having a plano rear side and defining an exposure opening, said housing further comprising a movable rear wall normally located behind said chambers and said frame; a film cartridge provided in one of said chambers; a film-collecting member provided in the other of said chambers, that length of the film which extends between said cartridge and said member being adjacent to the rear side of said frame and overlying said opening; a presser plate provided in said housing and located behind said length of film, said presser plate including a plurality of interconnected panel-shaped portions and defining with the front portion of said housing an elongated narrow channel through which said length of film extends; film transporting means including a movable member adjacent to said channel opposite one of said panel shaped portions, another one of said panel-shaped portions being located opposite said exposure opening; and resilient means operating between said rear wall and said presser plate for biasing said panel-shaped portions in a direction to reduce the width of said channel, the bias of said resilient means upon said one panel-shaped portion exceeding the bias upon said other panel-shaped portion.

9. A structure as set forth in claim 8, wherein said resilient means is arranged to connect said panel-shaped portions to each other so that, by overcoming the bias of said resilient means, such panel-shaped portions are movable with reference to each other.

10. A structure as set forth in claim 8, wherein said resilient means comprises at least one leaf spring and wherein said presser plate comprises two panel-shaped portions each of which is connected with said spring.

References Cited

UNITED STATES PATENTS

| | | | |
|---|---|---|---|
| 2,040,018 | 5/1936 | Kilfitt | 95—31 |
| 2,464,790 | 3/1949 | Bolsey | 95—31 |
| 2,888,867 | 6/1959 | Suzukawa | 95—31 |
| 2,924,158 | 2/1960 | Kopp et al. | 95—31 |
| 3,103,861 | 9/1963 | Koeppe | 95—31 |

FOREIGN PATENTS

| | | |
|---|---|---|
| 607,356 | 12/1934 | Germany. |
| 1,101,946 | 3/1961 | Germany. |

NORTON ANSHER, *Primary Examiner.*

J. F. PETERS, *Assistant Examiner.*